(12) United States Patent
Miller

(10) Patent No.: US 6,938,397 B2
(45) Date of Patent: Sep. 6, 2005

(54) PACKAGE WRAPPING METHOD AND APPARATUS

(75) Inventor: Michael E. Miller, South Beloit, IL (US)

(73) Assignee: Met-Tech Corp., Meridian, MS (US)

( * ) Notice: Subject to any disclaimer, the term of this patent is extended or adjusted under 35 U.S.C. 154(b) by 0 days.

(21) Appl. No.: 10/256,468

(22) Filed: Sep. 27, 2002

(65) Prior Publication Data

US 2004/0060264 A1 Apr. 1, 2004

(51) Int. Cl.[7] .............................................. B65B 11/00
(52) U.S. Cl. ...................... 53/461; 53/389.4; 53/389.3; 53/410; 53/66; 53/218; 53/220; 53/55
(58) Field of Search ........................ 53/461, 460, 66, 53/209, 218, 220, 389.4, 389.3, 55, 56, 58, 504, 547

(56) References Cited

U.S. PATENT DOCUMENTS

| | | | |
|---|---|---|---|
| 3,816,969 A | * | 6/1974 | Zimmerman et al. .......... 53/66 |
| 4,501,106 A | * | 2/1985 | Treiber et al. ................. 53/66 |
| 4,583,345 A | * | 4/1986 | Hirosaki et al. ............... 53/77 |
| 4,831,809 A | | 5/1989 | Ballestrazzi et al. |
| 5,299,410 A | | 4/1994 | Freeman |
| 5,406,770 A | | 4/1995 | Fikacek |
| 5,535,573 A | | 7/1996 | Focke et al. |
| 5,651,237 A | | 7/1997 | De Luca |
| 5,655,356 A | | 8/1997 | Ginestra et al. |
| 5,671,593 A | | 9/1997 | Ginestra et al. |
| 6,050,057 A | | 4/2000 | Tuyn et al. |
| 6,115,999 A | | 9/2000 | Adelman |
| 6,349,526 B1 | | 2/2002 | Newman |
| 6,363,690 B1 | | 4/2002 | Lay et al. |

* cited by examiner

*Primary Examiner*—Rinaldi I. Rada
*Assistant Examiner*—Brian Nash
(74) *Attorney, Agent, or Firm*—Garvey, Smith, Nehrbass & Doody, L.L.C.; Charles C. Garvey, Jr.

(57) ABSTRACT

A semi-automatic gift or package wrapping method and apparatus is disclosed. The apparatus includes a machine frame that provides a work surface with measuring and wrapping sections. A sheet feed and cutting mechanism feeds paper from a role in two steps with a time pause in between for enabling a user or operator to partially wrap the package with part of the first section of dispensed paper web. Thereafter, the second section of paper web is dispensed and the web cut transversely at a trailing edge. Multiple selectable supply rolls are optionally provided, or a single roll machine can be used. Longitudinal cutters trim the sides of the paper to obtain a custom desired width for the full cut sheet. A user interface display controls machine functions such as start, continue and sheeter. In the sheeter mode, a selected number of sheets of a selected size can be dispensed and cut for use at another workstation to warp other boxes of known uniform size (i.e. shirt boxes at a department store).

48 Claims, 10 Drawing Sheets

FIG. I.

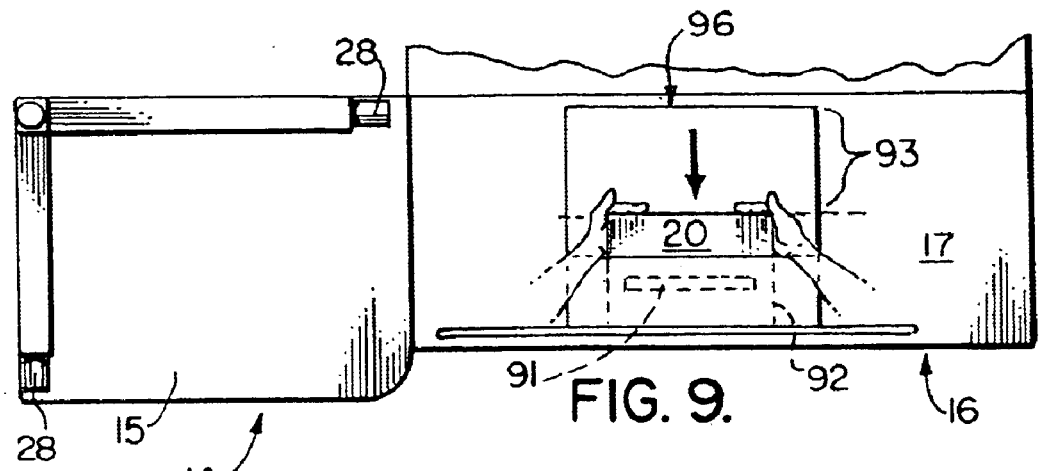
FIG. 9.
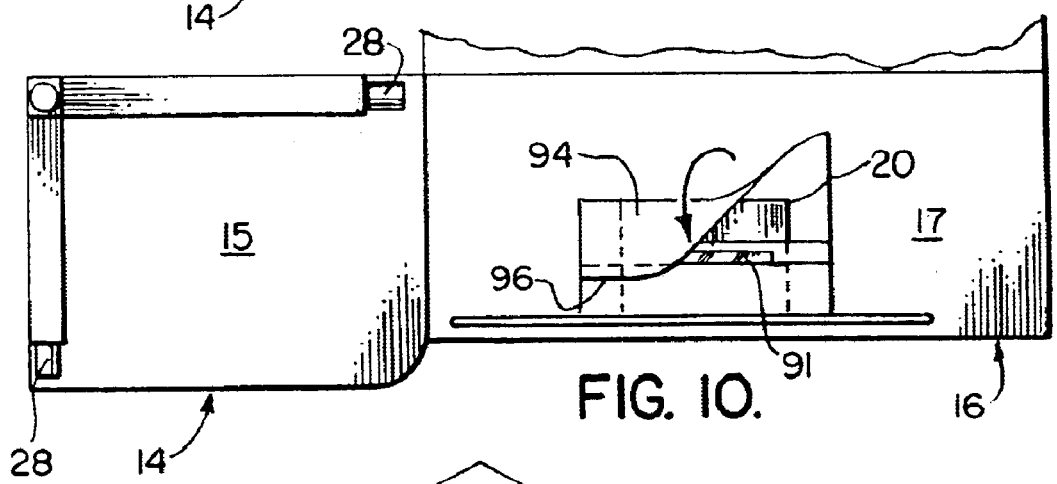
FIG. 10.
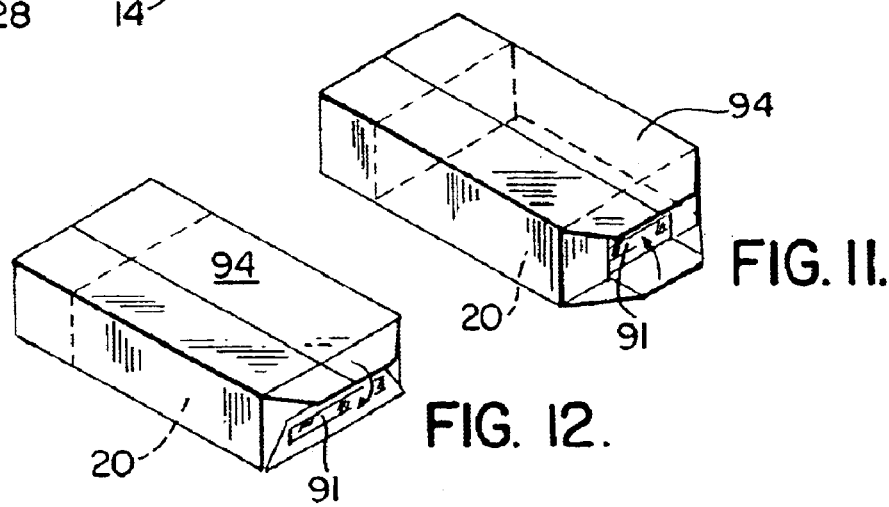
FIG. 11.
FIG. 12.

PACKAGE WRAPPING METHOD AND APPARATUS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a method and apparatus for wrapping articles such as boxes and more particularly to an improved method and apparatus for semi-automatically wrapping boxes of differing or random sizes in sequence, wherein the box to be wrapped is automatically measured, its dimensions optionally displayed on a user interface screen, and wherein a first section of a full sheet of paper web is dispensed from a supply roll for enabling an operator to partially wrap the box that was previously measured, followed by a further dispensing of the sheet of paper web to provide a second section of the full sheet, the cut full sheet providing preselected dimensions that provides an optimum size full cut sheet paper to wrap the package, while minimizing waste.

2. General Background of the Invention

There are numerous types of automated wrapping machines which have been devised in the past. They are usually suited to a particular purpose, and have their limitations when attempts are made to apply them to other purposes.

For example, the typical wrapping machine found in the supermarket for applying heat-seal film to packages of butchered meat presents a clear face on the top for display of the meat and hides all the gathered ends and spare film on the bottom of the package. The machine works well in the supermarket for wrapping butchered meat, but would not do an adequate job of wrapping articles of random size, such as gifts in boxes.

Another class of machine is available for high speed application of preprinted, precut wrappers to product, such as candy bar wrappers to candy bars. While the finished package is attractive and neatly wrapped, the product is usually of a single size, and the wrappers are precut to accommodate that single size.

Considering that the packages can be of any random size within limits, the ability to meet that requirement is not straight forward. If it is attempted to meet the requirement by using precut sheets which are large enough to accommodate the largest box, difficulty will be encountered in presenting a neat appearance in the wrapped package for boxes which are smaller than the maximum size.

A typical application for such machines is in gift wrapping. In department stores that offer gift wrapping services, the wrapping is usually done completely by hand. It is labor intensive, sometimes incapable of keeping up with peak demands, and oftentimes subject to variable quality of finished product. In hand wrapping, whether the individual uses cut sheets or roll paper, the entire operation of trimming the sheet to size, placing the box on the sheet, folding the paper over the box and making the taped or glued attachments is done by hand using sight and with the judgment of the individual exercised at most steps of the process. Skill and judgment are required to reliably produce attractively wrapped packages on a regular basis.

Various patents have issued that are directly to automated packaging and automatic gift wrapping machines. U.S. Pat. No. 5,535,573 discloses such an apparatus (blank unit) for feeding blanks to an article which is to be wrapped.

The de Luca U.S. Pat. No. 5,651,237 discloses a method for automatically feeding from a roll, successive pairs of inflatable packaging bags each having a common intermediate inflation channel to present the end bag upon a base platform for receiving an item to be packaged, and then to fold the other bag of the pair thereover to envelope the same; and then sealing the enveloping bags to provide a package of appropriate item size, inflating the bags through the inflation channel, and finally severing the inflated package from the roll.

The Ginestra U.S. Pat. No. 5,655,356 (hereby incorporated herein by reference) is entitled "Automatic Package Wrapping Machine". That patent names Michael E. Miller (applicant herein) as a co-inventor. The '356 patent discloses an automatic package wrapping machine that wraps a box of arbitrary size. The box is placed in the machine following which all operations are automatic. As the box is immediately advanced to a ready-to-wrap position, its length, width and height are automatically measured. Papers withdrawn from a supply roll and automatically cut to a size calculated to wrap the box. The paper is automatically applied to wrap four sides of the box without causing the box to tilt or tumble. The ends are then automatically wrapped by folding and sealing of flaps, whereupon a neatly wrapped box is ejected from the machine.

Another Ginestra and Miller patent is U.S. Pat. No. 5,671,593 (hereby incorporated herein by reference) entitled "Semiautomatic Package Wrapping machine". In the Ginestra '593 patent, an automatic package wrapping machine wraps a box of arbitrary size. The box is placed in the machine following which all operations are automatic. As the box is automatically advanced to a ready to wrap position, its length, width and height are automatically measured. Paper is withdrawn from a roll supply and automatically cut to a size calculated to wrap the box. The paper is automatically applied to wrap four sides of the box without causing the box to tilt or tumble. The ends have been automatically processed by folding and sealing the flaps, whereupon a neatly wrapped box is ejected from the machine.

The Tuyn et al. U.S. Pat. No. 6,050,057 discloses a packaging apparatus for packaging mail items, magazines, books, CDs and like products composed of one or more layers comprising a product assembling path, a folding station, and a separating station. The folding station comprising a first conveyor belt on which at least a part of the packing material web is located which extends below the products to be packed, a pulley element which is arranged above the first conveyor belt and engages part of the packing material web located on the top side of the products to be packed, and connecting means by means of which the longitudinal edges of the packing material web are interconnected, a pressure plate which is arranged above the first conveyor belt, the top side of which pressure plate is engaged by the pulling element, in operation, with the interposition of at least the longitudinal edges of the packing material web, the distance between the first conveyor belt and the bottom side of the pressure plate being such that the products of different thickness can pass there between.

In the Adelman U.S. Pat. No. 6,115,999 there is disclosed a gift wrap article forming method providing wrapping material which is padded and waterproof.

The Newman U.S. Pat. No. 6,349,526 discloses an automated packaging machine.

The Lay et al. U.S. Pat. No. 6,363,690 discloses an automatic measuring device and method for dispensing materials.

BRIEF SUMMARY OF THE INVENTION

The present invention provides an improved semi-automatic method and apparatus for wrapping a package such as a gift box. The method includes the providing of an apparatus that can be in the form of an enlarged frame or table having work surface areas that can include a wrapping station and a measuring station.

One or more paper supply roll dispense paper to be used for wrapping. Longitudinal and transverse cutters are provided for trimming the paper. The longitudinal cutters trim the sides of the paper web to provide a sheet for wrapping of desired width. The transverse cutter cuts the web of paper to provide a desired length to the sheet of paper to be used for wrapping.

At the measuring station, the package is placed against a first set of stops at a fixed and known location that is spaced away from the wrapping station. Stop bars index the package during measurement and again during wrapping. Preferably three measuring devices simultaneously contact the package and measure its length, width, and height.

The package measurements are stored in a computer. They can also optionally be displayed on a user interface screen. The screen provides a keypad that can be used to initiate machine functions. For example, a key is depressed when the package is to be measured. Once measured, a first section of paper web is automatically dispensed from the roll and cut longitudinally to provide a desired width. The package is then placed on the first section of paper. A keypad entry is made by the user so that an additional section of paper web is dispensed, i.e. a second section that is also cut, but both longitudinally and transversely. The second section of paper web is cut to a desired width, and is also transversely cut to define the overall length of the full cut sheet to be used in wrapping.

When the first section of the paper web of wrapping paper is dispensed, the package to be wrapped is manually placed on the first section of paper web and partially, manually wrapped by an operator.

When the second section is of paper web is dispensed, the remaining portion of the package is manually wrapped.

This two step dispensing of the paper web enables an operator to manually wrap a portion of the box, placing the cut sheet leading edge at a seam. This seam can easily be matched with the trailing edge of the wrapping paper when the second section of wrapping paper has been dispensed and then cut transversely. In so doing the package is encircled and wrapped with the cut sheet to cover the box top, bottom, front and rear. The operator then finishes the wrap by hand folding the end folds (i.e. sides of the paper web) inwardly to cover the box or package ends.

In the method of the present invention, stops can optionally be provided at the measuring station in the form of a pair of stop bar members to define an index position during measuring. The method can include placing the package in contact with both of the stop members. A side and an end of the package that are ninety degrees apart can each engage a stop member. This indexing to both of the stop members ensures that an accurate measurement will be made of every box or package, even when the boxes to be wrapped are of random, unknown dimensions.

The box can be measured using a plurality of preferably three mechanical measuring devices such as traveling pads. The pads can move from an initial position spaced away from the box or package to a position that contacts the box or package and then returning to the initial position. Measurement of the length, width and height of the box is complete when each pad has contact to the box and moved away from it.

The method of the present invention can include a preliminary step of applying adhesive material to the box prior to the measuring step or prior to wrapping. Alternatively, no adhesive can be applied to the box, wherein adhesive tape can be manually applied to the wrapping paper as it is wrapped about the package or box. It should be understood that other measuring devices can be employed such as acoustic sensors, optical sensors or the like.

The semi-automatic random size over wrapping machine of the present invention is based on the principle of automatic measurement of a box or package by the push of an input and by that input of measurement paper is dispensed off of a selected roll that is cut to the exact width and length for that box.

The paper web is dispensed from the selected supply roll in two stages. First the paper web is dispensed to a length that puts a seam spot in a predesignated area on the package (e.g. at the transverse centerline of the package or box top panel). The package is placed against a stop, centered and ready for the operator to fold and tape the dispensed first section of the paper web. With another input the remainder of the paper is dispensed while the operator pulls the box back against the backstop. The box or package is ready for finishing, the over wrapping by the operator. End folds are cut to the predescribed length and ready for operator folding and taping. The whole process requires no manual trimming and increases quality and productivity.

The present invention thus provides an improved semi-automatic gift wrapping method and apparatus that increases productivity as much as threefold compared to conventional manual gift wrapping.

The present invention provides a method and apparatus that precuts sheets that provide higher quality.

The apparatus of the present invention is easy to operate and provides minimal waste. The present invention provides an improved method and apparatus that enables an operator to select a sheeter mode for providing multiple sheets of the same size to multiple conventional manual package wrapping stations for use in wrapping high volume sizes such as, for example, shirt boxes and the like.

The present invention provides a method and apparatus for wrapping gifts or packages that enables the user to easily size a precut sheet with a desired seam locator, end flap length and overlap.

The present invention provides a semiautomatic gift or package wrapping station that enable packages of different sizes to be wrapped including very small package sizes. A maximum package size is determined by the paper width, but there is practically no maximum as long as the paper roll is of sufficient length.

The present invention enables a package to be wrapped that is very heavy, limited only by the maximum package weight that can be handled safely by the operator.

The present invention provides an improved semiautomatic gift or package wrapping station that can be in the form of a single roll machine or an optional multi-roll machine wherein the operator selects a particular roll such as for example one roll from several rolls of different pattern wrapping paper.

The method of the present invention is semiautomatic, enabling an operator to very quickly wrap a package. As part of the method of the present invention, the package or box to be wrapped is first placed in a corner of the measuring station, abutting two provided stop bar members. The user then presses a "start" key on a provided user interface display screen. The box is then measured, and a first section of paper is dispensed from a selected supply roll. This first section that is dispensed is cut only longitudinally (and not transversely), to define the width of the paper.

The user then places the box or package to be wrapped on the first section of dispensed, cut paper sheet and against a ruled stop at the wrapping station, preferably centering the package in between the sides of the cut paper. A ruled gauge or other means can be provided on the wrapping station stop to aid an operator in centering the box on the wrapping paper section that has been dispensed.

After the first section of the sheet of paper for wrapping has been dispensed, the user manually wraps the paper around the box or package and tapes the leading edge of the dispensed sheet section to the top of the box. This operation can be done by manually taping the leading edge to the box. Alternately, double-sided tape or adhesive can be applied to the box before it is measured (or shortly thereafter) Any other adhesive could be employed at this manual step.

An additional key that is provided on the user interface display is a "continue" key that, when depressed, causes a second section of the sheet of paper to be dispensed. When the "continue" key is pressed, the user then manually pulls the box away from the wrapping section stop as the paper advances. The second section of paper is then cut both longitudinally and transversely. The transverse cut is made at the trailing edge of the sheet of paper to be used in wrapping.

The operator then manually completes the over wrap by folding the trailing edge of the cut sheet up to meet the leading edge and then folds and tapes the enfolds manually to complete the wrap.

An optional feature of the present invention is a "sheeter" feature. The sheeter feature is used when an operator wants to cut and dispense multiple sheets of paper of the same size such as for example to wrap a number of boxes of the same size and shape at a different work station.

To operate the sheeter function, the "sheeter mode" key on the user interface display panel is pressed. The box is then placed on the measuring station and measured. The operator selects the quantity of sheets to be dispensed and cut. The box is measured and each of the sheets is automatically cut to size. This enables a user at another (conventional manual) work station to obtain for example a selected number of sheets of paper to wrap several boxes of the same size, such as shirt boxes.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIGS. 4–12 are fragmentary views of the preferred embodiment of the apparatus of the present invention and illustrating the method of the present invention;

DETAILED DESCRIPTION OF THE INVENTION

Figure 1:
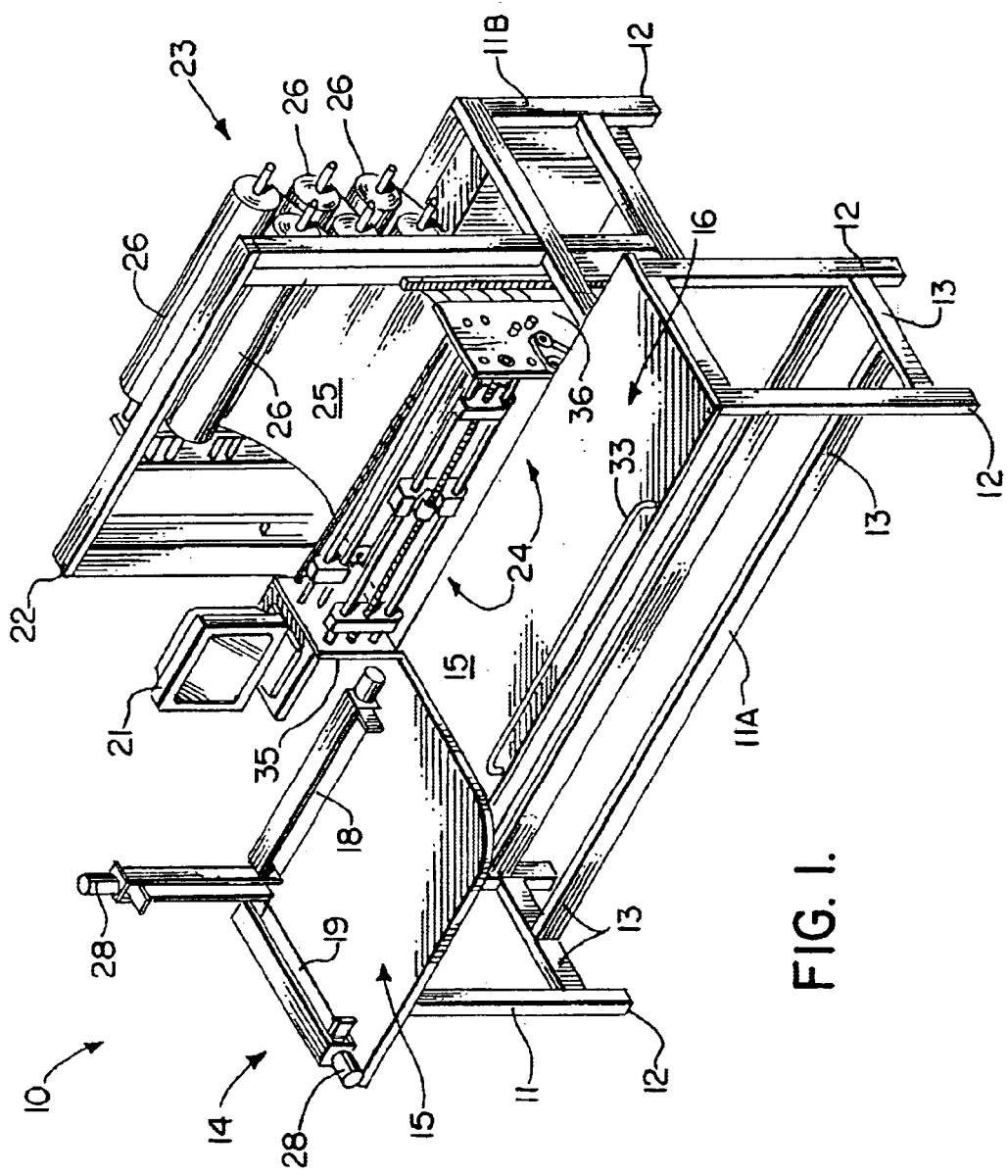
FIG. 1 is a perspective view of the preferred embodiment of the apparatus of the present invention.

FIG. 1 shows generally the preferred embodiment of the apparatus of the present invention designated generally by the numeral 10. Gift wrapping apparatus 10 includes a structural frame 11 that can be of welded steel or the like. Frame 11 is comprised generally of a front frame section 11A and a rear frame section 11B. The frame 11 can be comprised of a plurality of vertical members that can include legs 12 and a plurality of transverse or horizontal supports 13.

Figure 5:
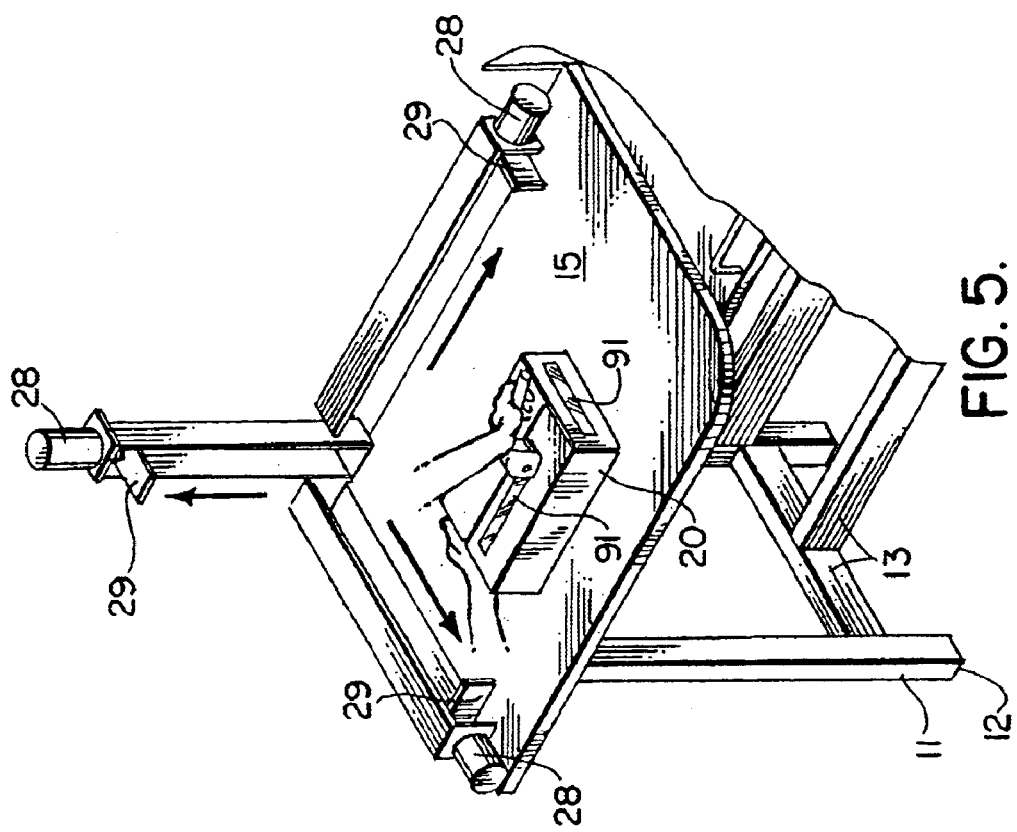
Figure 4:
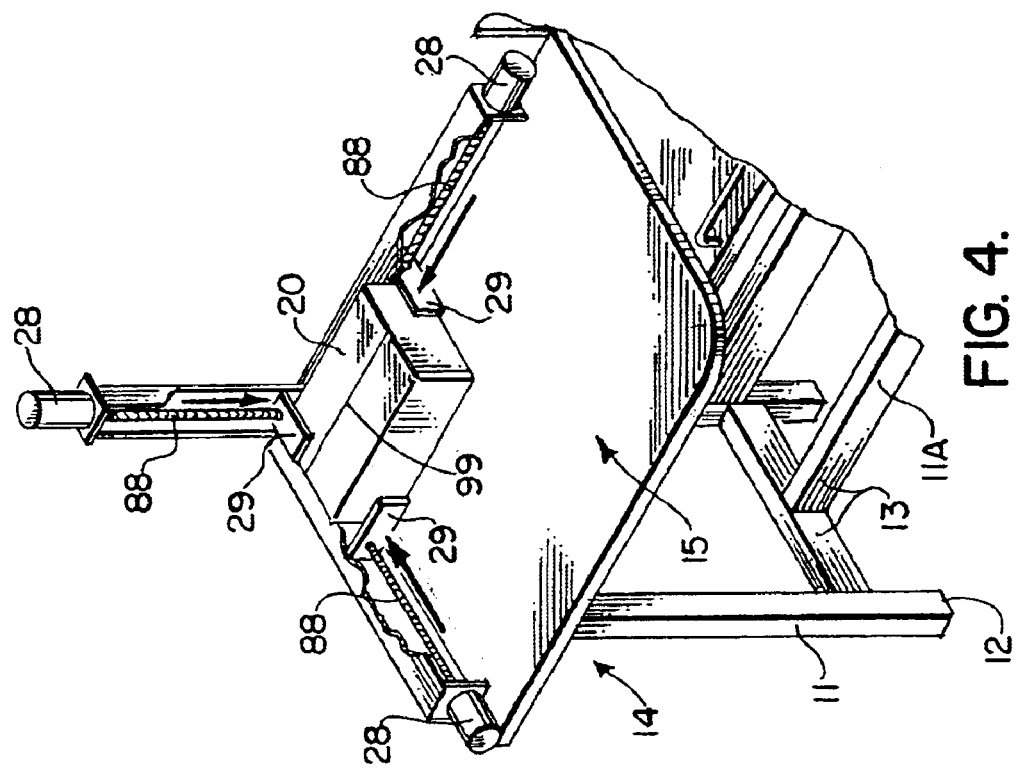

Frame 11 is provided with a measuring station 14, wrapping station 16, paper supply 23, and a paper feed and cutting mechanism 24. At measuring station 14, a pair of stop bar members 18, 19 are provided along two edges of measuring station 14 work surface 15 as shown in FIG. 1. The stop bar members 18, 19 preferably define an angle of 90 degrees. When a package 20 is to be wrapped, it is first placed on work surface 15 of measuring station 14. A side and an end of the box of package 20 are placed respectively against stop bar members 18, 19 Home key 70 of user interface display 21 is depressed to initialize the system. The start key 27 of user interface 21 is then depressed. The package 20 is then measured. There are three measuring devices oriented along orthogonal axes as shown in FIGS. 1 and 4–5. Each measuring device is comprised of a programmable intelligent motor 28 that rotates a threaded shaft 88 that engages a pad 29. The motors 28 for each measuring device rotate their shaft 88 until the pad moves from an initial position to engage the package to be measured before returning to the original position. The measurement devices are commanded by computer to drive pads 29 into the box 20 until each of their respective motor 28 switches are actuated. Then the motors 28 stop and reverse the direction of shafts 88, returning pads 29 back to their initial, home position and the box 20 dimension is captured via switch input to the motor 28 The input of the switch signals each motor 28 in its internal program to send via serial lines the encoder counts traveled up until the switch was made. The computer in its program uses these counts to compute the length, height and width of the box 20 for all subsequent operations.

User interface display screen 21 is provided that has a number of windows for displaying values such as dimensions of the box that is measured and a number of other windows that are in the form of keypad keys for inputting in information "start", "continue" (key 74), "sheeter" (key 75), paper select (key 76), paper supply roll number (keys 77–82), and the selected roll number display (key 83). Other machine functions can include a number of boxes wrapped indicator (key 84), clear key 85, time of last box display 86 and average time display 87

Figures 13, 14:
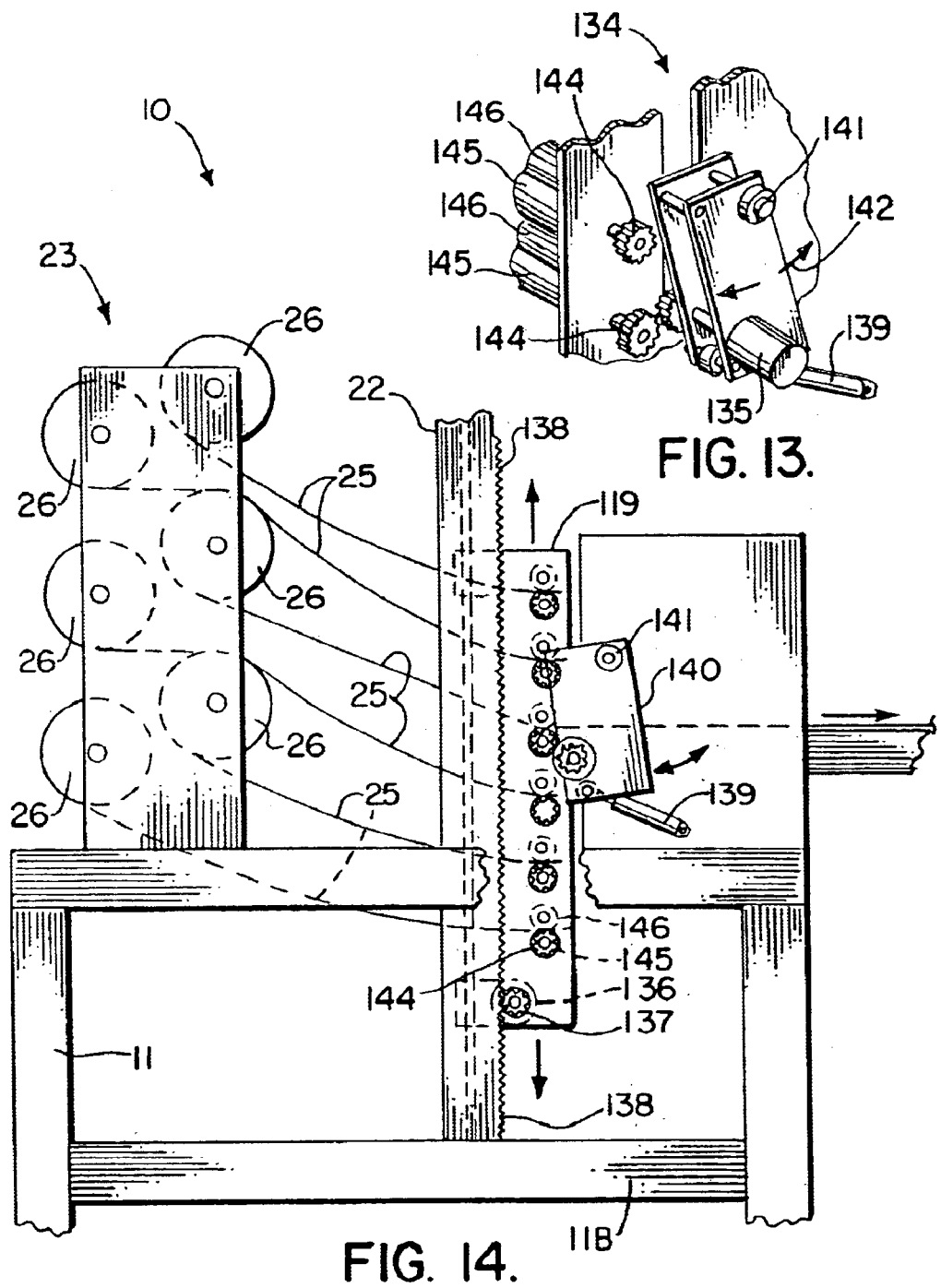
FIG. 13 is a fragmentary side view of the preferred embodiment of the apparatus of the present invention.
FIG. 14 is a fragmentary view of the preferred embodiment of the apparatus of the present invention.

A superstructure 22 supports paper supply 23 and its paper web and feed rollers (see FIGS. 13–14) in a fashion that enables any selected roll of paper 26 to be used in a wrapping operation. Alternatively, the apparatus can be a single roll machine.

Each supply roll 26 thus provides a paper web 25 that can be advanced from the selected supply roll 26 and fed to a paper feed and cutting mechanism designated generally by the numeral 24 in FIG. 1. At this paper feed and cutting mechanism 24, the paper web is fed from the supply roll 26 that is selected toward the work surface 17 of wrapping station 16 and simultaneously trimmed if necessary to provide a desired width. The "width" is automatically set by spacing two rotary knives or other like cutting devices, a selected distance apart immediately before the paper web 25 is fed through the paper feed and cutting mechanism 24 toward work surface 17 of wrapping station 16.

Figure 6:
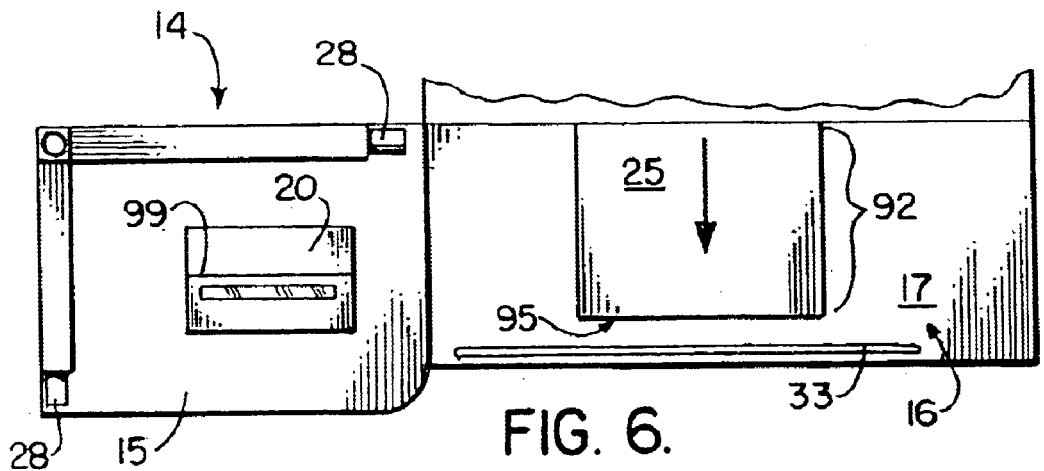
Figure 7:
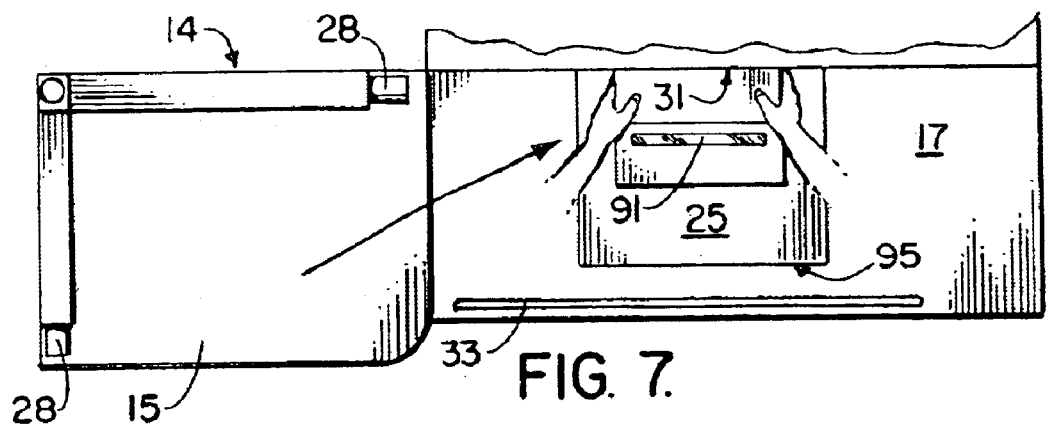
Figure 8:
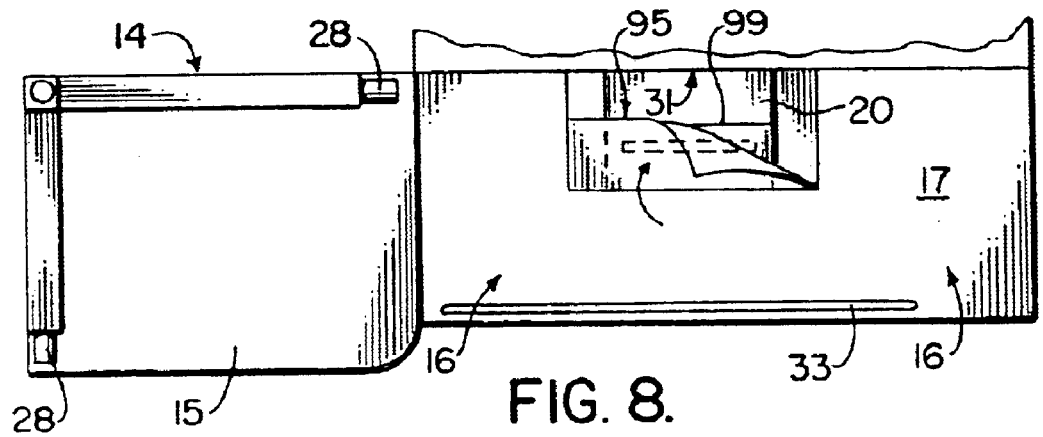

As part of the method of the present invention (see FIGS. 4–12), the paper web 25 is then automatically fed until a sheet of paper for wrapping of desired width and length has been dispensed and cut. This feeding operation is accomplished in two steps. A first section 92 of the web 25 of paper on the selected roll 26 is fed and simultaneously trimmed to a selected width (see FIGS. 3 and 6). Before the second section 93 of web 25 is fed, a user places box 20 on web 25 (see FIG. 7), manually over wraps part of the package or box to be wrapped with the first section and ensures that it is adhered to the package or box using tape (see FIG. 8), adhesive, preapplied double-sided tape strips 91 or the like. The user then uses continue key 72 of interface display 21 to key in a continuation of the process so that the second section 93 of the web is fed (see FIG. 9). At this time, the user pulls box 20 to backstop 33 as the second section 93 of paper web 25 is dispensed. This second section 93 is cut longitudinally with cutters 42, 43 to the selected width, but also transversely to determine the overall length of the cut sheet to be used for wrapping and to provide trailing edge 96. At this point the user can then wrap the remainder of the box by over wrapping the box with a transversely cut trailing edge 96 of the full cut sheet of paper 94 (see FIG. 10) and then folding the ends in a traditional manner (see FIGS. 11, 12). The ends of the package or box can be then taped or simply adhered to adhesive or double-sided tape strips 91 that had been applied before or just after the measuring step.

Figure 2:
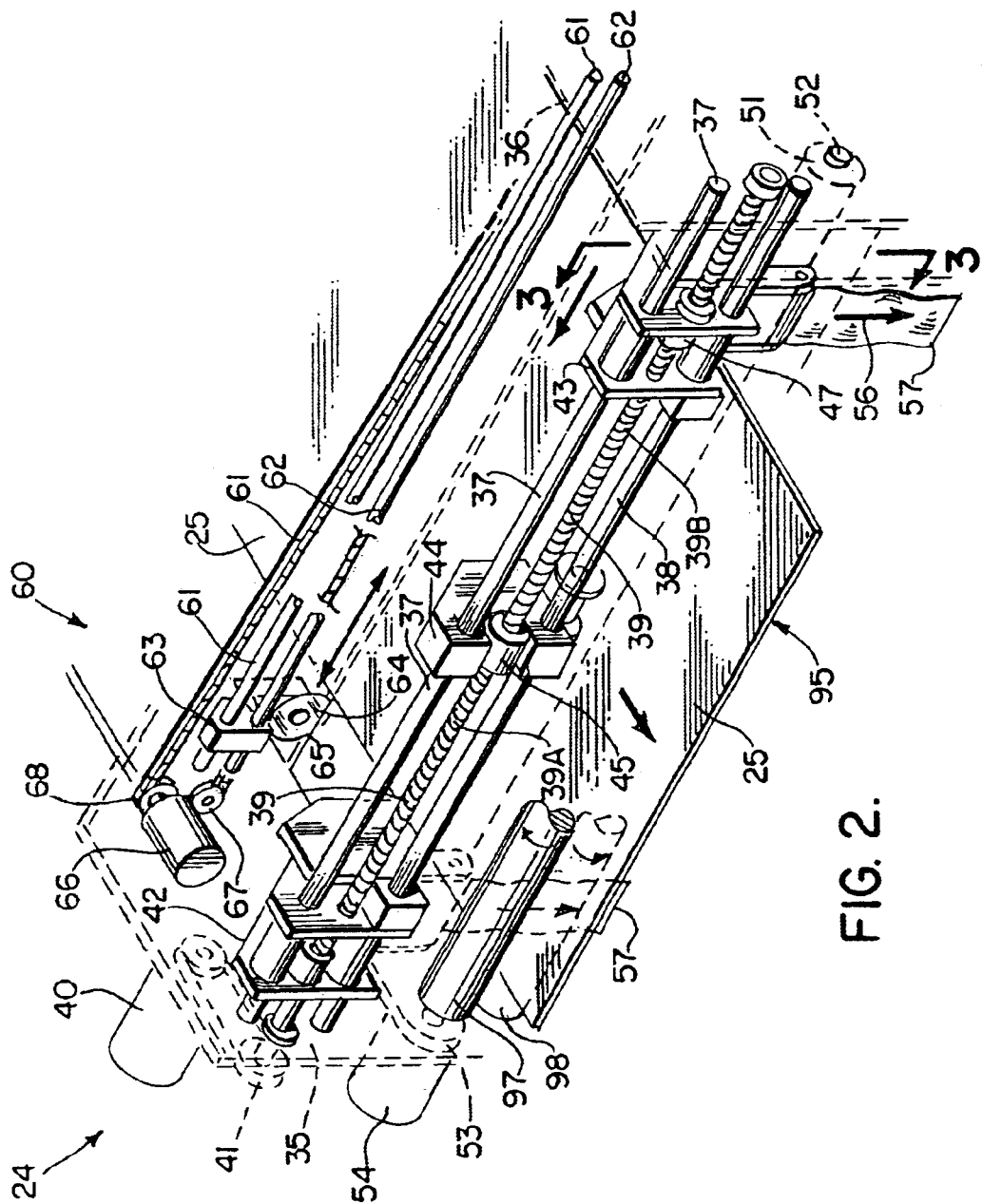
FIG. 2 is a partial perspective view of the preferred embodiment of the apparatus of the present invention illustrating the paper feed and cutting mechanism.
Figure 3:
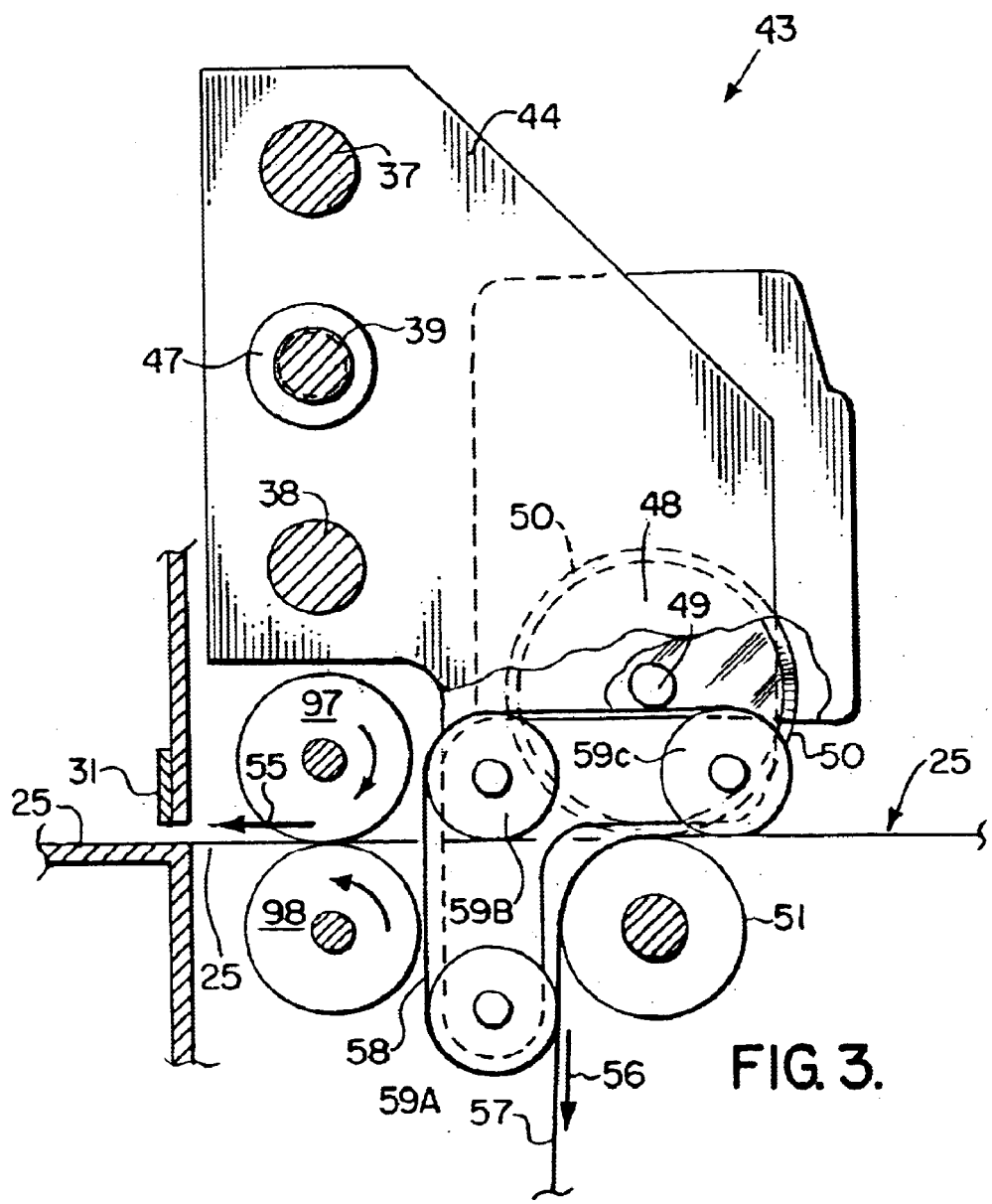
FIG. 3 is a sectional view of the preferred embodiment of the apparatus of the present invention taken along the lines 3—3 of FIG. 2.

FIGS. 2–3 show paper feed and cutting mechanism 24 in more detail. A pair of rails 37, 38 are attached to FIG. 11 at support plates 35, 36. Threaded shaft 39 is positioned generally in between and parallel to rails 37, 38 as shown in FIG. 2. Threaded shaft 39 is driven by motor 40 and belt 41. Left 42 and right 43 longitudinal rotary cutters are provided with internally threaded nuts 46, 47 that engage the threads of shaft 39 so that when the motor 40 rotates shaft 39 in one direction, the cutters 42, 43 slide upon rails 37, 38 and move apart. When motor 40 rotates shaft 40 in an opposite rotational direction, cutters 42, 43 move together. The threads on shaft sections 39A, 39B are thus helical threads that spiral in opposite directions. In between sections 39A, 39B is support 44 having bushing 45 that rotatably supports shaft 39. Support 44 is affixed to rails 37, 38.

In FIG. 3, a single longitudinal cutter 43 is shown in more detail. However, the construction left longitudinal cutter 42 can be substantially the same as that shown for right longitudinal cutter 43 of FIG. 3. Cutter 43 can include housing 44 that slides upon rails 37, 38. Internally threaded nut 47 engages externally threaded shaft 39 at section 39B. Rotary cutter wheel 48 rotatably attaches at central shaft 49 to housing 44. Wheel 48 has cutting edge 50. Edge 50 engages roller 51 when cutting so that when web 25 passes between edge 50 and roller 51 it is cut, trimming the sides of web 25 to provide a desired overall width. Roller 51 is driven by shaft 52 that engages belt 53 driven by motor 54. The cutter shells 48 of both cutters 42, 43 engage roller 51.

When the paper web 25 is to be trimmed to a final width that is narrower than the width of the web 25 as contained on a selected supply roll 26, cutters 42, 43 are moved with motor 40 to a correct spacing. A first section 92 of the paper web 25 is then advanced as indicated by arrow 25 in FIG. 3. Each cutter 42, 43 cutter wheel 48 cuts the paper web 25. The waste that is trimmed from the sides of paper web 25 is directed downwardly as indicated by arrow 56 in FIG. 3 as waste strip 57. Endless belt 58 mounted on idler rollers 59A, 59B, 59C ensures that waste strip 57 moves down in the direction of arrow 56. Feed rollers 97, 98 feed paper web 25 to work surface 17. Rollers 97, 98 can be driven by motor 54 or can be driven by their own motor or motors.

In addition to the longitudinal cutters 42, 43 there is provided a transverse cutter 60. The transverse cutter 60 cuts the paper web 25 after the paper web is advanced twice in sequence with a pause in between (see FIGS. 7–9) for enabling an operator or user to manually wrap part of package 21. Transverse cutter 60 includes a carriage or housing 63 slidably mounted upon rails 61, 62. Rails 61, 62 are firmly anchored to frame 11 rear section 11B. Rotary blade 64 having cutting edge 65 is rotatably mounted upon carriage 63. Motor drive 66 drives endless belt 69 with drive roller 68. Belt 69 can be supported with guide rollers as needed such as roller 67, and one or more guide rollers (not shown) that support the part of belt 69 that is spaced away from motor 66. In order to cut web 25 and provide the trailing edge to a full cut sheet of desired size, cutter wheel 64 travels back and forth upon rails 61, 62 as indicated by arrow 70 in FIG. 2.

Figure 16:
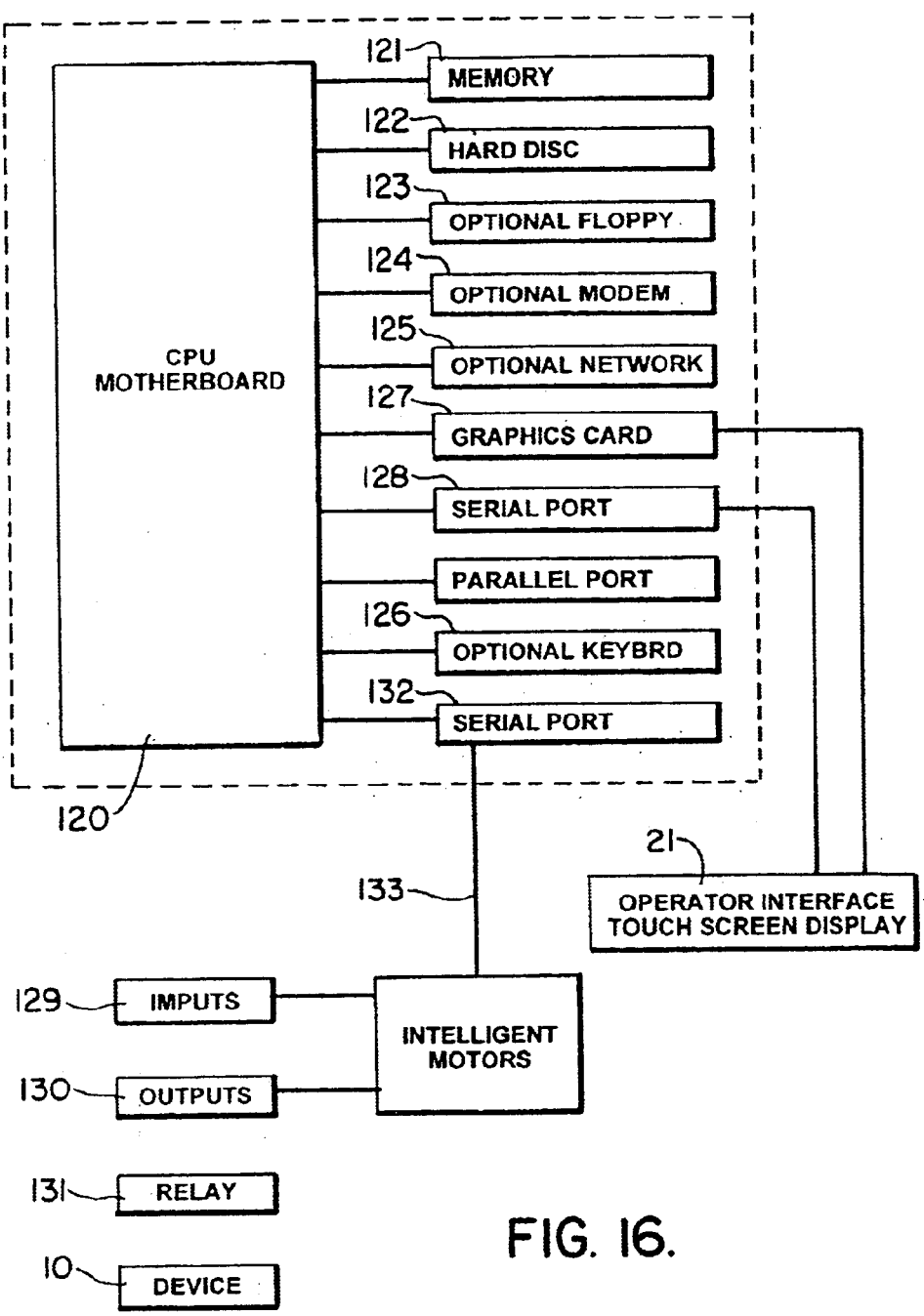
FIG. 16 is a block diagram illustrating machine control for the semi-automatic wrapping apparatus of the present invention.

FIG. 16 is a flow chart illustrating the primary elements of a controller capable of operating the apparatus 10 of the present invention of FIG. 1. The controller is based upon a conventional CPU motherboard 120. Internal to the computer 120 is a standard memory 121 which can consist of a combination of random access memory, ROM and/or disk memory 122, 123 which contains the program to achieve the functionality described herein. The conventional microprocessor 120 can optionally be equipped with modem 124, network 125, keyboard 126.

Figure 15:
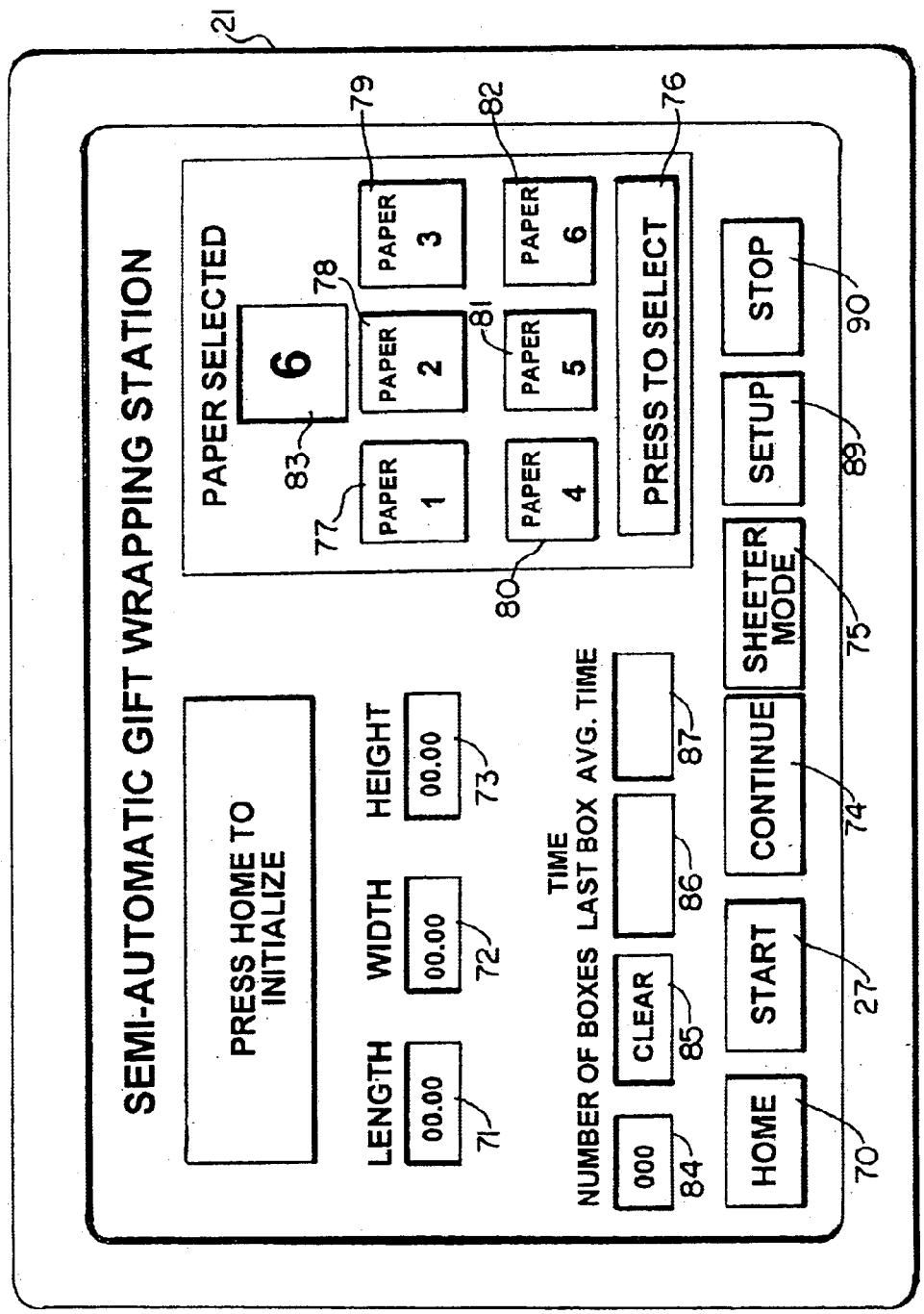
FIG. 15 is a view of the user interface display panel portion of the preferred embodiment of the apparatus of the present invention.

User or operator interface display 21 (see FIGS. 1 and 15) can interface with microprocessor 120 using graphics card 127 and serial port 128.

The Microprocessor 120 interfaces to the apparatus 10 through the serial line 133 that connects to the intelligent motors, example being 28. The serial line 133 passes all information to the intelligent motors, 28 and others, from the microprocessor 120 and controls such aspects as velocity, acceleration, position through encoder counts and other variables as required. Inputs 129 are generally directed through the motors which process the input in the appropriate manner as commanded. Outputs 130 are generally directed from the motors, 28 and others, based on specific motor programming and control a relay 131 which in turn, turns on and off devices such as solenoid valves.

One of the outputs produced by the microprocessor for driving the package wrapping machine 10 is the serial communication to the numerous intelligent drive motors. The serial line daisy chains between all motors, each of which has its own address and is connected to the microprocessor 120. Alternative control schemes could be utilized and include different communication links between the motors. Additionally the motor system could be constructed utilizing conventional servo motors, stepping motors, dc motors, air cylinders and combinations of all used and suggested. These motors could require separate drives and motion controllers which also could be separate or in combination. In either case a microprocessor of some type would control the apparatus 10 in some manner. This microprocessor could be constructed as an embedded controller or perhaps a PLC.

Figure 17:
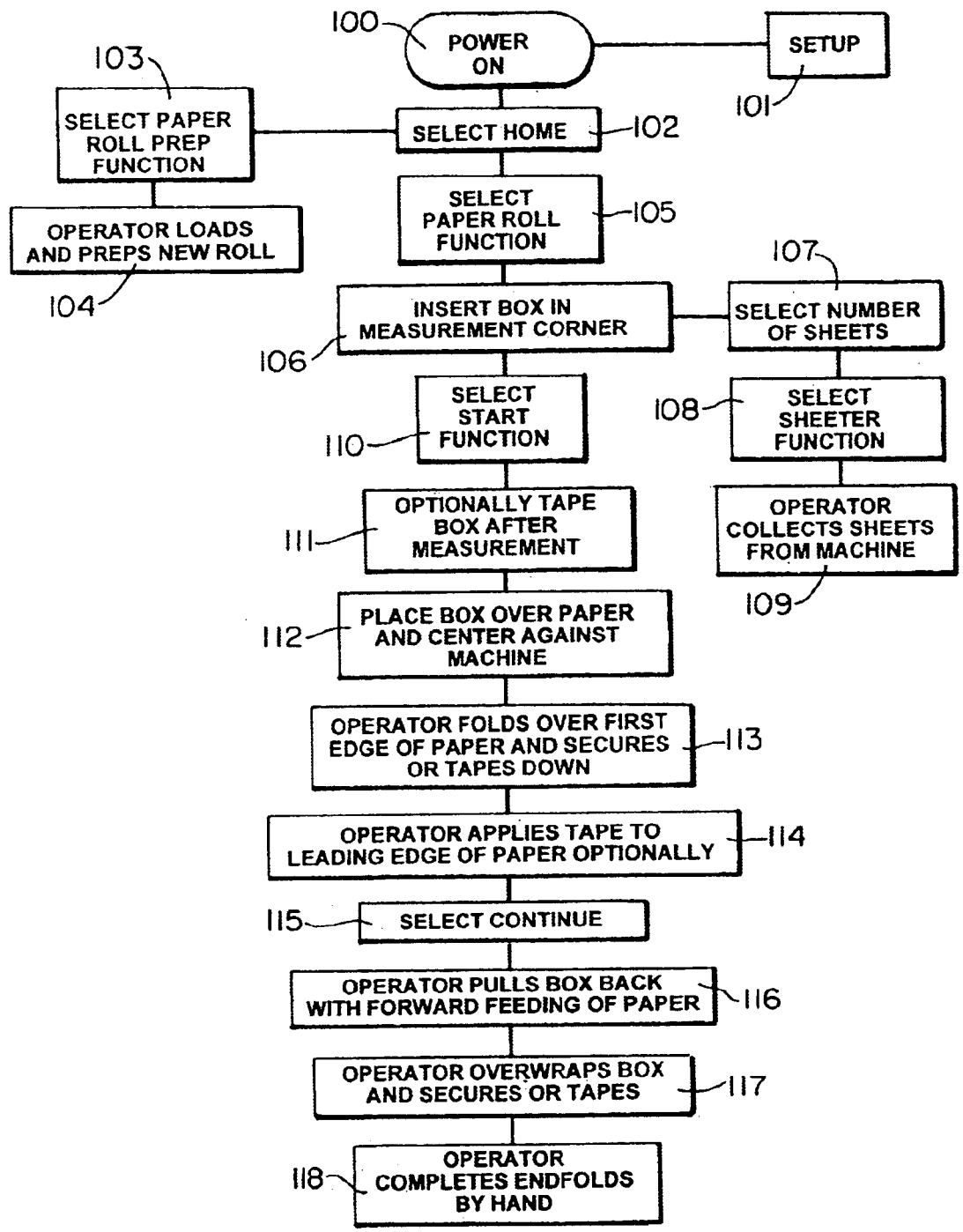
FIG. 17 is a flow chart illustrating a sequence of steps for the control system of FIG. 16.

FIG. 17 represents a program of operation by which the processor system of FIG. 16 operates to control the package wrapping machine of FIGS. 1–14. The blocks of FIG. 17 are described in terms of their functionality in connection with the semi-automatic package wrapping machine 10 of the present invention. The process starts 100 at which point an operator or user applies power to the apparatus 10. Power application boots up computer, powers up the motors, and resend programming information to the motors via serial line.

Setup 101 is a function accessible from the operator interface display 21 that allows the operator to change certain parameters and additionally allows maintenance and service personnel to adjust certain offset numbers if so necessary. Many of the initial machine start up variables are carried here and can be modified for any reason. These items that can be changed include but are not limited to such variables as motor speed, acceleration, offsets, number of roll positions.

Pushing the Home Button 102 on the operator interface sends variables to the motors which select the appropriate homing program in each motor. Motor drives to home position against a hard stop in torque mode. It senses the rise in torque and stops and backs off the home stop a variable amount and sets zero to the motor encoder. Subsequent moves reference the zero set point.

The machine may be equipped with one or more supply rolls of paper 26. If only equipped with one roll 26, this function does not apply and roll loading and prep is a manual function. If the machine 10 is so equipped with more than one roll 26, then the operator interface display 21 provides that number of roll selections (see keys 76–83 of user interface display 21). A prep button is provided and after the roll number is selected the prep button would be pushed for prepping. The select button is then pushed to start the required move. The roll elevator upon command then positions the roll position selected to a distance above the normal feed in point that is convenient for the operator to thread the paper web 25 and cut it off square against a feed out guide. When a selection is made the paper feed engagement assembly 134 is released via an air valve and the roll elevator motor moves the number of encoder pulses and direction sent to the motor 135 over the serial port 132 and line 133 for that roll position from its current position. Once the roll elevator halts motion the paper feed engagement assembly is preengaged.

A new roll 26 can be loaded at this point 104 and prepping can occur for that roll. For each box in a multi-roll machine, the option can be made at this point 105 for the operator to select the paper roll for that box 20. Selection is made via the operator interface display 21. The operator selects the roll position to run (see keys 77–82) and pushes the select button (see key 76). The elevator motor 136 is then sent via the serial port 132 and serial line 133 the number of encoder pulses to move from its current location and additionally the motor rotational direction. The paper feed engagement assembly 134 disengages before movement and renegades after the movement is complete (see FIG. 13). Air cylinder 139 moves assembly 134 housing 140 to rotate about pivot 141 as indicated schematically by arrow 142 in FIG. 13. Gear 143 is driven by motor 135. Gear 143 engages the selected gear 144 of a feed roller and its companion roller 146. When housing 140 is rotated to engage pinion 137 with gear 144, a pair of rollers 145, 146 can pull paper web from a particular, selected supply roll 26. There are thus a pair of rollers 145, 146 for each supply roll 26.

For measurement of the box 106 to take place the operator must push the box into the corner of the measurement area. This is a manual function by the operator.

The Sheeter Function 107 allows the operator to select the number of sheets desired for a box size and the machine will output that number of precut sheets for that box. The first step is to enter the number of sheets required on the keypad of the operator interface.

Pushing Sheeter key 75 on the operator interface display 21 once a box is placed in the measurement corner actuates the Sheeter Function (operation 108). When the sheeter function (key 75) is pushed by the operator the measurement axis are commanded by computer to drive into the box until each of their respective switches are actuated. Then the motors stop and reverse back to their initial, home position and the box dimension is captured via switch input to the motor. The input of the switch signals the motor in its internal program to send via serial lines the encoder counts traveled up until the switch was made. The computer in its program uses these counts to compute the length, height and width of the box for all subsequent operations. It is after the measurement is calculated that the cutter motor is commanded to drive the cutters to a location that meets the requirements of the computer program for sheet width for the particular box. Additionally, the elevator paper feed motor and the main paper feed motor start and are directed to move a distance calculated by computer. Once the distance is met the cutter motor 60 is commanded by the computer program to cut the paper, which is already at its proper length for that box 20. This process continues until the last sheet is dispensed. At that point the elevator paper feed motor reverses and drives the paper that is at the knife position back to the elevator entrance position. At 109, the operator collects the sheets as they are dispensed from the machine. This is a manual operation.

At 110, pushing start key 27 on the operator interface display 21, once a box is placed in the measurement corner actuates the Start Function. When the Start function is pushed by the operator, the three measurement pads 29 are commanded by computer 120 to drive into the box 20 until each of their respective switches are actuated. Then the motors stop and reverse back to their home position and the box dimension is captured via switch input to the motor. The input of the switch signals the motor in its internal program to send via serial lines the encoder counts traveled up until the switch was made. The computer in its program uses these counts to compute the length, height and width of the box for all subsequent operations. It is after the measurement is calculated that the cutter motor 40 is commanded to drive the cutters 42, 43 to a location that meets the requirements of the computer program for sheet width for the particular box 20. The cutters and scrap belts are air loaded and when the cutters 42, 43 are commanded to move, the air pressure is removed from the devices and when the cutters reach destination the air pressure is commanded back on via outputs from the intelligent motors.

The elevator paper feed motor and the main paper feed motor start in unison when the cutters 42, 43 have nearly met their destination and are directed to move a distance calculated by computer. This distance is either the amount of paper (first paper web section 92) required to wrap around the box 20 to the seam spot 99 plus offset or the amount of paper required to satisfy the entire required length. If the former, then once that amount of paper 25 is dispensed the computer awaits an operator input to continue. If the latter, the cutter motor 66 is commanded by the computer program to cut the paper web 25 if the paper fed out is already at its proper length for that box 20. At that point the elevator paper feed motor reverses and drives the paper that is at the knife position back to the elevator entrance position in order a paper change does not damage the paper end. Once the paper is cut by the cutter 60, the main paper feed motor only advances the paper to the point where, when wrapped around the box 20, it would just overlap the seam spot 99 by the offset entered initially.

At the point in the last operation where the measurement devices have functioned it would be possible to apply adhesive transfer tape to the top and sides of the box for speedy manual paper adherence. Step 111 is an option for other taping methods or in fact could be done before the box is measured. This function is completely at the customer's option.

Once function 110 has completed, the operator repositions the box 20 that is still in the measurement corner over the dispensed paper up against the ruled box stop bar 31 on the machine frame 11. The operator additionally centers the box via zero centerline scale, operator display and scale or estimation, indicated as operation 112.

At 113, the operator manually pulls the paper tight over the box 20 while the box 20 is being held up against the box stop 31 of the machine frame 31. If the box 20 is prepared (as mentioned in item 111) above the operator adheres the leading edge 95 to the tape tightly. Other options at this point could be such methods as applying scotch tape or simply not taping at all and holding the edge of paper in place by hand for the next step.

Optionally at this point 114 the operator can apply adhesive transfer tape to the leading edge setting up the final adherence in the next step. Other options include doing nothing.

At this point 115 the operator selects the continue button on the operator interface display 21. This signals the paper feed motors or motor to advance the remainder of the paper (second section 93) or the length of paper to satisfy the overall length for the cut by transverse cutter 60. In either case the operator pulls back on the box 20 by hand while the paper 25 is feeding out. The operator pulls until the back edge of the box hits against the back box stop 33 on the worktable 17. The remainder of the paper is fed out at this point or somewhere during the pull back or after the paper stops feeding, the transverse shear knife 60 is actuated, paper 25 is cut to length and then the main paper feed motor dispenses the entire amount of paper out onto the work table 17. After final dispersal of paper (full cut sheet 94) the shear knife returns to its home position and the elevator paper feed motor is commanded to reverse to pull back the amount of paper in the machine that is up to the knife 60.

As described in item 115 above the operator pulls back on the paper keeping it tight while it being fed out of the machine. At 116, the operator pulls both paper web 25 and box 20 until the back of the box hits the backstop on the work table work surface 17.

At this point 117 the operator may pull the end of paper that just exited the machine 10 over the box 20 and adhere to the box 20 after pulling tightly. If the adhesive was not applied prior as described in item 114 he or she may tape it down in any other manner deemed necessary by the customer. Box 20 is now overwrapped (see FIGS. 10–11). At this point the operator may pass it to another operator for final manual enfolding or do that process himself (see FIGS. 11–12).

For operation 118, end folds, which are cut to a predetermined length by computer calculation, do not require additional trimming and fold in easily (see FIG. 12). If the box had adhesive strips 91 preapplied to the ends then the operator simply folds them in and pulls down the top flap over the preapplied adhesive. Next using any adhesive method the operator folds up the bottom flap and adheres. The operator repeats this process on the other end. Box 20 is completely wrapped ready for subsequent operations.

The apparatus 10 of the present invention could be set in a "repeat" mode. Thereby when hitting a provided repeat button on operator interface display 21, the machine 10 will simply deliver the same full cut sheet of paper 94 that was last cut from the prior measurement every time the start button is pushed. Therefore if there is a stack of 6 boxes, all of the same size, only the first one needs to be measured or have manual input of measurement. The repeat button could for example flash on and off until hit again to cancel the repeat function. This "repeat" function differs from the sheeter mode in that it optionally allows for wrapping each box utilizing the standard process.

The following is a list of suitable parts and materials for the various elements of the preferred embodiment of the present invention.

PARTS LIST

| Part Number | Description |
| --- | --- |
| 10 | gift wrapping apparatus |
| 11 | frame |
| 11A | front section |
| 11B | rear section |
| 12 | leg |
| 13 | horizontal support |
| 14 | measuring station |
| 15 | work surface |
| 16 | wrapping station |
| 17 | work surface |
| 18 | stop bar |
| 19 | stop bar |
| 20 | package |

-continued

PARTS LIST

| Part Number | Description |
|---|---|
| 21 | user interface display |
| 22 | superstructure |
| 23 | paper supply |
| 24 | paper feed and cutting mechanism |
| 25 | paper web |
| 26 | supply roll |
| 27 | start key |
| 28 | intelligent motor |
| 29 | measuring pad |
| 30 | elongated housing |
| 31 | ruled box stop bar |
| 32 | indicia |
| 33 | backstop |
| 34 | motor drive |
| 35 | support plate |
| 36 | support plate |
| 37 | upper rail |
| 38 | lower rail |
| 39 | externally threaded shaft |
| 39A | shaft section |
| 39B | shaft section |
| 40 | motor |
| 41 | belt |
| 42 | left longitudinal cutter |
| 43 | right longitudinal cutter |
| 44 | support |
| 45 | bushing |
| 46 | nut |
| 47 | nut |
| 48 | cutter wheel |
| 49 | shaft |
| 50 | cutting edge |
| 51 | roller |
| 52 | shaft |
| 53 | belt |
| 54 | motor |
| 55 | arrow |
| 56 | arrow |
| 57 | waste strip |
| 58 | belt |
| 59A | roller |
| 59B | roller |
| 59C | roller |
| 60 | transverse cutter assembly |
| 61 | upper rail |
| 62 | lower rail |
| 63 | carriage |
| 64 | blade |
| 65 | cutting edge |
| 66 | motor drive |
| 67 | roller |
| 68 | drive roller |
| 69 | endless belt |
| 70 | home key |
| 71 | length display |
| 72 | width display |
| 73 | height display |
| 74 | continue key |
| 75 | sheeter mode key |
| 76 | roll supply select key |
| 77 | roll number key |
| 78 | roll number key |
| 79 | roll number key |
| 80 | roll number key |
| 81 | roll number key |
| 82 | roll number key |
| 83 | paper supply number display |
| 84 | number of boxes display |
| 85 | clear key |
| 86 | time last box display |
| 87 | average time display |
| 88 | threaded shaft |
| 89 | setup key |
| 90 | stop key |

-continued

PARTS LIST

| Part Number | Description |
|---|---|
| 91 | adhesive strip |
| 92 | first page web portion |
| 93 | second page web portion |
| 94 | full cut sheet |
| 95 | leading edge |
| 96 | trailing edge |
| 97 | feed roller |
| 98 | feed roller |
| 99 | seam |
| 100 | power on step |
| 101 | setup step |
| 102 | select home step |
| 103 | select paper step |
| 104 | roll prep step |
| 105 | select paper roll step |
| 106 | insert box measure step |
| 107 | select sheets step |
| 108 | select sheeter function step |
| 109 | collect sheet step |
| 110 | start step |
| 111 | tape option step |
| 112 | centering step |
| 113 | first overwrap step |
| 114 | optional taping step |
| 115 | continue step |
| 116 | second section paper step |
| 117 | second overwrap step |
| 118 | end fold step |
| 119 | roll elevator |
| 120 | CPU motherboard |
| 121 | memory |
| 122 | hard disc |
| 123 | optional floppy disc |
| 124 | optional modem |
| 125 | optional network |
| 126 | optional keyboard |
| 127 | graphics card |
| 128 | serial port |
| 129 | input |
| 130 | output |
| 131 | relay |
| 132 | serial port |
| 133 | serial line |
| 134 | paper feed engagement assembly |
| 135 | paper feed motor |
| 136 | elevator motor |
| 137 | pinion gear |
| 138 | rack |
| 139 | air cylinder |
| 140 | housing |
| 141 | pivot |
| 142 | arrow |
| 143 | gear |
| 144 | gear |
| 145 | feed roller |
| 146 | feed roller |

The foregoing embodiments are presented by way of example only; the scope of the present invention is to be limited only by the following claims.

What is claimed is:

1. A method of wrapping a package of a random size, comprising the steps of;

a) providing a wrapping apparatus having a frame with a work surface that includes measuring and wrapping sections, a paper supply roll for dispensing a paper web to be used for wrapping, cutters for trimming the paper web and an index position that indexes a package for measurement at a fixed location on the work surface at the measuring section and that is spaced away from the wrapping section;

b) placing the package in the index position;

c) measuring the package dimensions when in the index position;

d) storing the package measurements in a computer;

e) computing a cut paper sheet size using the computer after step "d";

f) feeding only part of the cut paper sheet to define a first sheet section;

g) manually wrapping part of the package with the first cut paper sheet section;

h) feeding a second sheet section after step "g";

i) severing a full cut paper sheet from the paper supply roll that includes the first and second sheet sections; and j) manually wrapping the package with the full cut paper sheet after step "i".

2. The method of claim 1 wherein in step "a" the index position is defined by a pair of stop members and step "b" includes placing the package in contact with both of the stop members.

3. The method of claim 1 wherein in step "c" the package is measured physically by contacting the box with one or more measuring devices.

4. The method of claim 3 wherein the package rests upon a flat surface in step "b" and the box is measured by contacting at least the top of the package and one or more sides of the box with a measuring device.

5. The method of claim 1 further comprising applying adhesive means to the package for holding the full cut sheet to the package.

6. The method of claim 1 further comprising applying adhesive to the package before step "b".

7. The method of claim 1 wherein step "c" includes measuring the package to determine the length, width, and height of the package.

8. The method of claim 1 wherein step "c" includes measuring the package with plurality of sensors.

9. The method of claim 8 wherein the sensors include moving mechanical devices that move between disengaged and engaged positions, engaging the package when it is to be measured.

10. The method of claim 8 wherein the sensors are acoustic sensors.

11. The method of claim 8 wherein the sensors are optical sensors.

12. The method of claim 8 wherein in step "c" there are at least three sensors.

13. The method of claim 1 wherein in step "c" there are a plurality of moving mechanical sensors that move from a first position spaced from the package to a second position that engages the package during measurement.

14. The method of claim 1 further comprising providing a user interface display having a keypad, and wherein measurement is initiated between steps "b" and "c" by pressing a key on the keypad.

15. The method of claim 14 further comprising displaying the measurements obtained in step "c" on the user interface display.

16. The method of claim 14 wherein the user interface has a display with a plurality of data display windows.

17. The method of claim 16 further comprising displaying the measurements obtained in step "c" on the user interface display, each measurement in a separate window.

18. The method of claim 14 further comprising pressing a key of the keypad to initiate more than one of the method steps "c" through "g".

19. The method of claim 14 wherein the user interface display has a sheeter option key that enables one or more sheets to be dispensed that are each sized identically and further comprising printing multiple full cut sheets without wrapping a package until the sheet has been severed from the supply roll and shaped to wrap a package that was measured in step "c".

20. The method of claim 19 wherein the user interface display provides multiple sheeter option keys that enable multiple sheets to be dispensed in sequence, each sized and shaped to wrap a pre-selected standard package size.

21. A method of wrapping a random size package with wrapping paper, comprising the steps of:

a) providing a wrapping machine that includes a work surface, a measuring station having a plurality of measuring devices for measuring the length, width, and height of a package to be measured, one or more paper supply rolls, a plurality of cutters that enable the wrapping paper to be cut along longitudinal and transverse lines, and feed rollers for feeding a web of paper from a selected supply roll to the work surface;

b) placing a package to be wrapped on the work surface measuring station;

c) using the measuring station to measure the package;

d) dispensing a first section of the web of paper on the roll a first distance while simultaneously trimming the width of the web with one or both of the longitudinal cutters;

e) placing the package to be wrapped on the first section of the web dispensed in step "d".

f) manually wrapping part of the package with at least part of the first section of the sheet dispensed in step "d";

g) using the feed rollers to dispense a second section of the sheet from the roll;

h) transversely cutting the web after step "g" to provide a full cut sheet of wrapping paper that includes the first and second sections; and i) manually wrapping the remainder of the package after step "h" with the full cut sheet.

22. The method of claim 21 wherein in step "a" the machine includes a reference bar and step "e" includes placing the package against the reference bar.

23. The method of claim 22 wherein the reference bar is ruled with measurements, and further comprising centering the package on the reference bar at a centered position using the measurements on the ruled bar.

24. The method of claim 21 further comprising applying an adhesive over part of the package outer surface before step "e".

25. The method of claim 21 further comprising manually adhering the sheet of wrapping paper to the box by applying adhesive to the sheet of wrapping paper.

26. The method of claim 21 wherein in step "a" the wrapping machine has a user interface display that includes a keypad with keys and further comprising initiating one or more of the method steps "c" through "h" by depressing one of the keys on the user interface display keypad.

27. The method of claim 26 wherein step "c" is initiated by depressing a key of the keypad.

28. The method of claim 26 wherein step is initiated by depressing a key of the keypad.

29. The method of claim 21 wherein in step "c" a multiple of measuring devices measure the package.

30. A method of wrapping a random size package with wrapping paper, comprising the steps of:

a) providing a wrapping machine that includes a work surface, a measuring station having a plurality of measuring devices for measuring a plurality of dimensions of a package to be measured, one or more paper supply rolls, a plurality of cutters that enable the wrapping paper to be cut along longitudinal and transverse lines, and feed rollers for feeding a web of paper from a selected supply roll to the work surface;

b) placing a package to be wrapped on the work surface measuring station;

c) using the measuring station to measure dimensions of the package;

d) dispensing a first section of the web of paper on the roll a first distance while simultaneously trimming the width of the web with one or both of the longitudinal cutters;

e) placing the package to be wrapped on the first section of the web dispensed in step f) manually wrapping part of the package with at least part of the first section of the sheet dispensed in step "d";

g) using the feed rollers to dispense a second section of the sheet from the roll;

h) transversely cutting the web after step "g" to provide a full cut sheet of wrapping paper that includes the first and second sections; and i) wrapping the remainder of the package after step "i" with the full cut sheet.

31. The method of claim 30 wherein in step "c" the package is measured physically by contacting the box with one or more measuring devices.

32. The method of claim 30 wherein the package rests upon a flat surface in step "b" and the box is measured by contacting at least the top of the package and one or more sides of the box with a measuring device.

33. The method of claim 30 further comprising applying adhesive means to the package for holding the full cut sheet to the package.

34. The method of claim 30 further comprising applying adhesive to the package before step "b".

35. The method of claim 30 wherein step "c" includes measuring the package to determine the length, width, and height of the package.

36. The method of claim 30 wherein step "c" includes measuring the package with plurality of sensors.

37. The method of claim 36 wherein the sensors include moving mechanical devices that move between disengaged and engaged positions, engaging the package when it is to be measured.

38. The method of claim 36 wherein the sensors are acoustic sensors.

39. The method of claim 36 wherein the sensors are optical sensors.

40. The method of claim 36 in step "c" there are at least three sensors.

41. The method of claim 36 wherein in step "c" there are a plurality of moving mechanical sensors that move from a first position spaced from the package to a second position that engages the package during measurement.

42. The method of claim 30 further comprising providing a user interface display having a keypad, and wherein measurement is initiated between steps "b" and "c" by pressing a key on the keypad.

43. The method of claim 42 further comprising displaying the measurements obtained in step "c" on the user interface display.

44. The method of claim 42 wherein the user interface has a display with a plurality of data display windows.

45. The method of claim 44 further comprising displaying the measurements obtained in step "c" on the user interface display, each measurement in a separate window.

46. The method of claim 42 further comprising pressing a key of the keypad to initiate more than one of the method steps "c" through "g".

47. The method of claim 42 wherein the user interface display has a sheeter option key that enables one or more sheets to be dispensed that are each sized identically and further comprising printing multiple full cut sheets without wrapping a package until the sheet has been severed from the supply roll and shaped to wrap a package that was measured in step "c".

48. The method of claim 47 wherein the user interface display provides multiple sheeter option keys that enable multiple sheets to be dispensed in sequence, each sized and shaped to wrap a pre-selected standard package size.

* * * * *